US012601565B2

(12) United States Patent　　　　　(10) Patent No.:　US 12,601,565 B2

Szapiel et al.　　　　　　　　　　　　(45) Date of Patent:　Apr. 14, 2026

(54) ELECTRONIC REDUCTION OF PARALLAX ERRORS IN DIRECT-VIEW RIFLE SCOPES WITHOUT RANGING

(71) Applicant: RAYTHEON CANADA LIMITED, Ottawa (CA)

(72) Inventors: Stan Szapiel, Midland (CA); Kevin Burgess Wagner, Midland (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 341 days.

(21) Appl. No.: 18/202,511

(22) Filed: May 26, 2023

(65) Prior Publication Data

US 2024/0393086 A1　　Nov. 28, 2024

(51) Int. Cl.
　　*F41G 3/00*　　　(2006.01)
　　*F41G 1/38*　　　(2006.01)
　　*G02B 5/00*　　　(2006.01)
　　*G02B 27/00*　　(2006.01)

(52) U.S. Cl.
　　CPC .............. *F41G 3/005* (2013.01); *F41G 1/38* (2013.01); *G02B 27/0068* (2013.01); *G02B 5/005* (2013.01)

(58) Field of Classification Search
　　CPC ....... F41G 3/005; F41G 1/38; G02B 27/0068; G02B 5/005
　　USPC .......................................................... 359/739
　　See application file for complete search history.

(56) References Cited

U.S. PATENT DOCUMENTS

| | | | |
|---|---|---|---|
| 8,286,383 B2 | 10/2012 | Matthews | |
| 2004/0025397 A1* | 2/2004 | Malley ..................... | F41G 1/38 42/122 |

| | | | |
|---|---|---|---|
| 2006/0201046 A1* | 9/2006 | Gordon ..................... | F41G 1/54 42/123 |
| 2007/0062092 A1* | 3/2007 | Roes ......................... | F41G 1/30 42/140 |
| 2009/0064514 A1* | 3/2009 | Roes ......................... | F41G 1/38 33/227 |
| 2017/0191796 A1* | 7/2017 | Scroggins ................. | F41G 1/38 |
| 2020/0285039 A1* | 9/2020 | Havens .................. | F41G 3/142 |
| 2021/0164758 A1* | 6/2021 | Jahromi ................. | G02B 23/02 |
| 2023/0027786 A1 | 1/2023 | Szapiel | |
| 2023/0041606 A1 | 2/2023 | Maryfield et al. | |

FOREIGN PATENT DOCUMENTS

GB　　　　　2512915 A　　10/2014

OTHER PUBLICATIONS

European Search Report issued in counterpart EP application No. 24175383.9 on Oct. 29, 2024.

* cited by examiner

*Primary Examiner* — Sharrief I Broome

(74) *Attorney, Agent, or Firm* — NORTON ROSE FULBRIGHT CANADA LLP

(57)　　　　　　　ABSTRACT

An example rifle scope includes a plurality of light emitting devices for sending illuminations directed to a distal end of the rifle scope. A plurality of optical detectors detects reflected light received from the distal end of the rifle scope. Each of the optical detectors produces data regarding the reflected light each optical detector observed. A processor device receives the data on the reflected light from the optical detectors and adjusting a position of a field lens so an eyepoint projected in a target space of the rifle scope coincides with an optical axis of the rifle scope removing parallax errors due to misalignment.

20 Claims, 4 Drawing Sheets

402

SEND ILLUMINATIONS DIRECTED TO AN EYE POSITIONED AT A DISTAL END OF AN OPTICAL DEVICE

404

DETECT REFLECTED LIGHT RECEIVED FROM THE EYE

406

RECEIVE THE DATA ON THE REFLECTED LIGHT FROM THE OPTICAL DETECTORS

408

ADJUST A POSITION OF A FIELD LENS

400

ELECTRONIC REDUCTION OF PARALLAX ERRORS IN DIRECT-VIEW RIFLE SCOPES WITHOUT RANGING

BACKGROUND

When using personal targeting systems, such as rifle scopes, motion parallax can cause errors in aiming and lead to missed targets. The target's location influences this parallax error in relation to the aiming reticule, which is projected through the front optics of the scope. Additionally, parallax error can be affected by changes in local temperature. Completely and quickly eliminating parallax errors in all operational conditions remains an important and unsolved practical issue.

SUMMARY

According to one aspect of the subject matter described in this disclosure, an example rifle scope is provided. The rifle scope includes a plurality of light emitting devices for sending illuminations directed to a distal end of the rifle scope. A plurality of optical detectors detects reflected light received from the distal end of the rifle scope. Each of the optical detectors produces data regarding the reflected light each optical detector observed. A processor device receives the data on the reflected light from the optical detectors and adjusts a position of a field lens so an eyepoint projected in a target space of the rifle scope coincides with an optical axis of the rifle scope removing parallax errors.

In some implementations, the light emitting devices may be light emitting diodes (LEDs). The optical detectors may be photodiodes. The light emitting devices may be positioned in a first ring. The optical detectors may be positioned in a second ring different from the first ring of the light emitting devices. A select number of the optical detectors and the light emitting devices may be positioned in a first ring. The first ring of light emitting devices may be positioned on a field stop. The second ring of optical detectors may be positioned on an aperture stop. The first ring of the select number of the optical detectors and the light emitting devices may be positioned on an aperture stop. The processor device may send commands to at least one actuator for adjusting the position of the field lens.

According to another aspect of the subject matter described in this disclosure, an example method for parallax compensation is provided. The method includes: sending, using a plurality of light emitting devices, illuminations directed to a distal end of an optical device; detecting, using a plurality of optical detectors, reflected light received from the distal end of the optical device, each of the optical detectors producing data regarding the reflected light each optical detector observed; and receiving, using a processor device, the data on the reflected light from the optical detectors; and adjusting, using the processor device, a position of a field lens so an eyepoint projected in a target space of the optical device coincides with an optical axis of the optical device removing parallax errors due to misalignment of the eye.

In some implementation, the method may include positioning the light emitting devices in a first ring. The method may include positioning the optical detectors in a second ring different from the at least one ring of the light emitting devices. The method may include positioning a select number of the optical detectors and light emitting devices in a first ring. The method may include positioning the first ring of light emitted devices on a field stop. The method may include positioning the second ring of optical detectors on an aperture stop. The method may include positioning the first ring having the select number of the optical detectors and light emitting devices on an aperture stop. The method may include sending, using the processor device, commands to at least one actuator for adjusting the position of the field lens.

According to another aspect of the subject matter described in this disclosure, an example parallax compensation system is provided. The parallax compensation system includes a plurality of light emitting devices for sending illuminations directed to a distal end of an optical device. A plurality of optical detectors detects reflected light received from the distal end of the optical device. Each of the optical detectors produces data regarding the reflected light each optical detector observed. A processor device receives the data on the reflected light from the optical detectors and adjusts a position of a field lens so an eyepoint projected in a target space of the optical device coincides with an optical axis of the optical device removing parallax errors.

In some implementations, the processor device may be configured to: determine, based on the data, a center of gravity (COG) of the reflected signals distributed over the least one ring; determine whether the COG is positioned on an optical axis of the optical system; and upon determining the COG is not positioned on the optical axis, adjust a position of a field lens so an eyepoint projected in a target space of the optical system coincides with the optical axis removing parallax errors due to misalignment of the eye.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Figure 1:
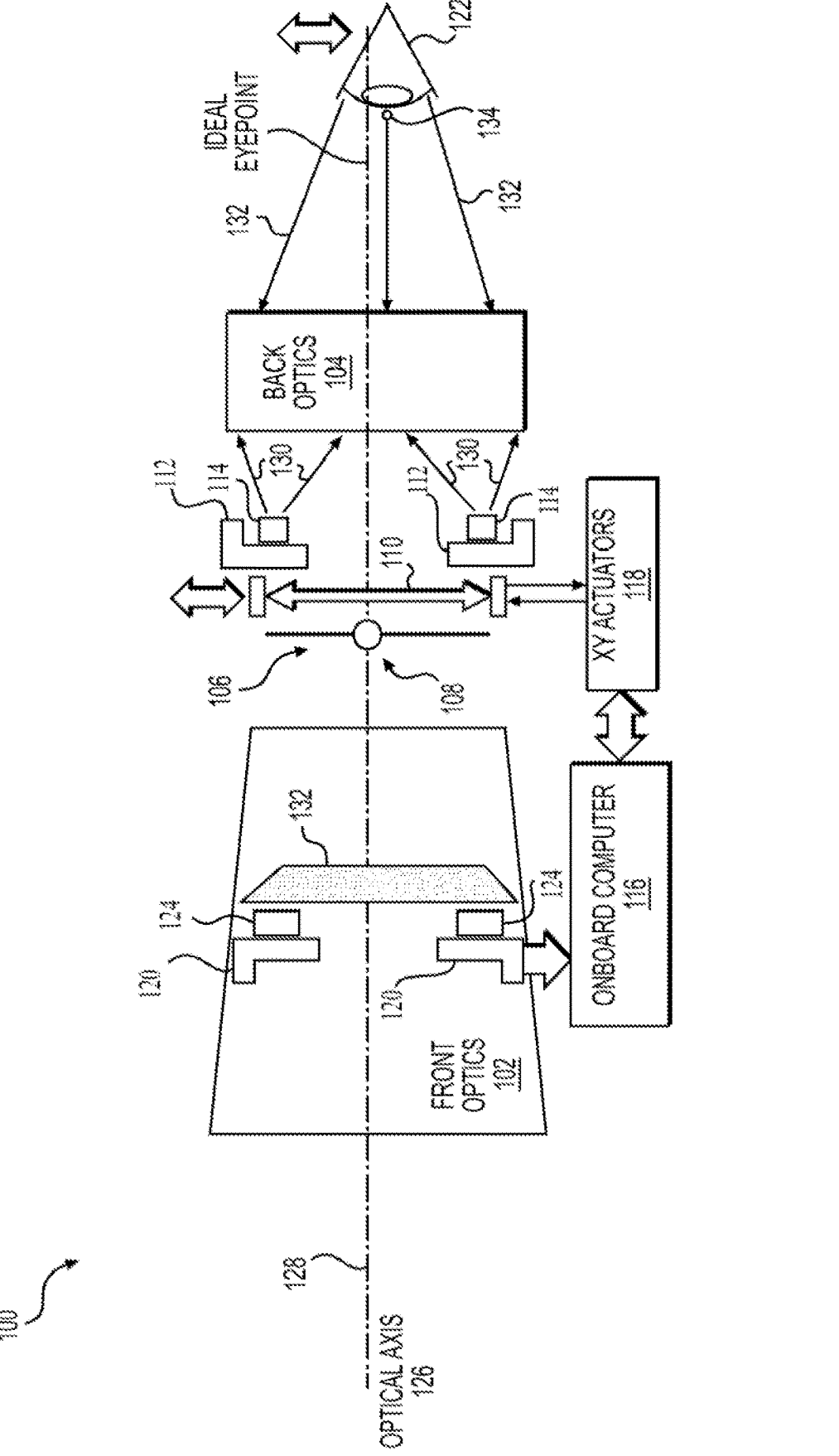
FIG. 1 is a schematic block diagram of an example parallax compensation system.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

This disclosure describes a method and system for compensating parallax errors in direct-view scopes without requiring range. The system dynamically removes parallax errors in real-time by moving the exit pupil to compensate for the misalignment and therefore the eye is not misaligned. The reticle and target are focused at one conjugate. The system corrects the exit pupil to ensure the correct eye position. Additionally, the system uses a ring architecture for near-infrared (NIR) illumination and detection, eliminating the need for bulky and heavy beam splitters and combiners. Finally, using an actuator, the system utilizes a controllable field lens to adjust for parallax by moving horizontally, vertically, or both.

FIG. 1 is a schematic block diagram of an example rifle scope 100 with parallax compensation. The components allowing for parallax compensation may be part of an integrated component and internally placed rifle scope 100. Rifle scope 100 includes a front optics 102, back optics 104, a focal plane 106, a reticule 108, a controllable field lens 110, field stop 112, ring 114 of NIR time-modulated LEDs, onboard computer 116, and actuators 118. Front optics 102 includes lenses and/or prisms between the objective and focal plane 106. Additionally, front optics 102 has aperture stop 120. Aperture stop 120 determine the amount of light that reaches the eye 122 to form an image. Aperture stop 120 includes a ring 124 positioned thereon. The structural details of ring 124 will be described further below in FIG. 2B.

Focal plane 106 is located amidst front optics 102 and back optics 104 of the rifle scope 100. A reticle 108 is present on the focal plane 106 along with an imaginary line, optical axis 126, that determines the light path through the scope 100. Adjacent to focal plane 106 is a controllable field lens 110, which has a controllable decenter brought about by actuators 118 operated by the onboard computer 120. Onboard computer 116 includes one or more processors capable of controlling and performing the required operations and memories for storing applications and relevant data. Moreover, onboard computer 116 provides for applications to communicate and control the operations of actuators 118. In some implementations, onboard computer 116 may be an embedded processor or the like placed within rifle scope 100. In other implementations, onboard computer 116 may be external to rifle scope 100. In this instance, rifle scope 100 100 may include wireless capabilities to receive and send data to onboard computer 116.

Actuators 118 provides controllable transverse misalignment to the controllable field lens 110, which helps bring back the eyepoint 128 to coincide with the optical axis 126 of the rifle scope 100 in the target space. Controllable field lens 110 is aligned parallel to focal plane 106. It corrects the parallax errors caused due to the horizontal and vertical misalignment of the current eyepoint 134 of eye 122 with respect to the optical axis 126. Actuators 118 may include microelectromechanical systems (MEMS) actuators that convert electrical signals into mechanical movements of controllable field lens 110. Actuators 118 can shift controllable field lens 110 horizontally, vertically, or rotate it to introduce controllable transverse misalignment. Alternatively, actuators 118 can be electrostatic, electrothermal, electromagnetic, or piezoelectric.

Field stop 112 is positioned between controllable field lens 110 and back optics 104. Field stop 112 limits the angle from which light is collected (field of view) at back optics 104. In this implementation, field stop 112 is a circular field stop. In other implementations, field stop 112 may be non-circular. Moreover, field stop 112 may be a diaphragm, a constriction on an optical aperture, or the like. In addition, ring 114 of light emitting diodes (LEDS) may be positioned on field stop 112. The structural details of rings will be described further below in FIG. 2A.

Ring 114 of LEDs are configured to illuminate the eye 122 via illuminations 130. Ring 124 of optical photodetectors are configured to receive the light scattered back from the eye via reflected signals 132. Ring 124 of optical photodetectors each sends to onboard computer 116 data regarding the illuminations received from reflected signals. Onboard computer 116 sends commands to actuators 118 to adjust controllable field lens 110 until ring 124 of optical photodetectors receive equal illumination. The adjustment amount is deduced from the initial asymmetry of reflected signals 132 received by ring 124 of optical photodetectors.

In this case, onboard computer 116 determines the location of the center of gravity (COG) of reflected signals 132 distributed over ring 124. If the COG lies on optical axis 126, no further action is required (optical photodetectors of ring 124 received equal illumination). Otherwise, onboard computer 116 determines the COG coordinates used to determine the proper decenter of controllable field lens 110. The relationship between the COG coordinates and the decenter coordinates can be established experimentally by calibrating rifle scope 100. Since controllable field lens 110 is, by its definition, located very close to focal plane 106, the decenter of controllable field lens 110 has neither impact on target imagery nor reticule imagery.

Although used with a rifle scope in this instance, the approach described herein to compensate for parallax error can also be used with other firearms with an imaging component. Additionally, the approach described herein to compensate for parallax error can be applied to other optical systems and devices, such as telescopes.

Figure 2B:
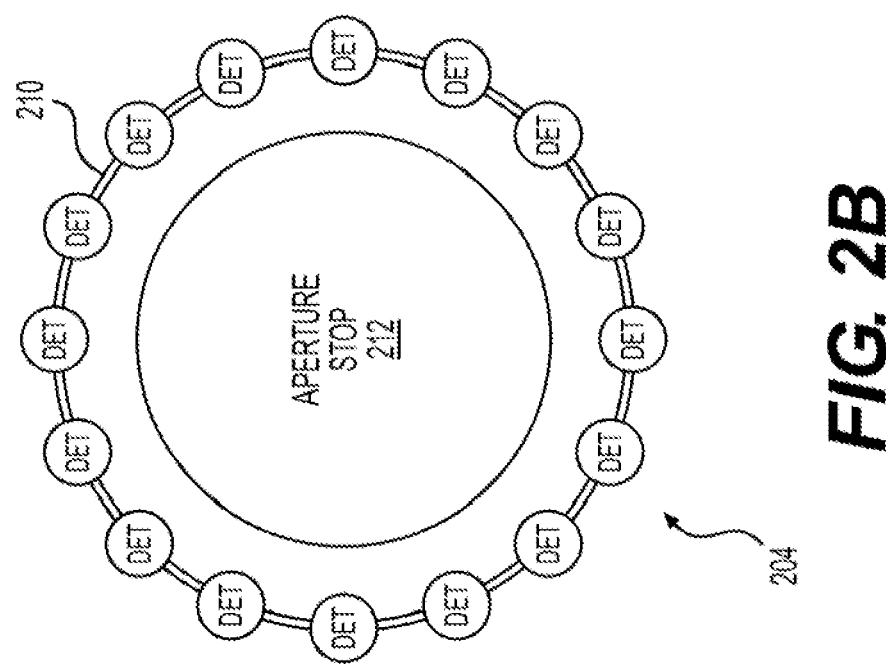
FIGS. 2A-2B are schematic diagrams of example rings of the light emitting diodes (LEDs) and the optical photodetectors of FIG. 1.
Figure 2A:
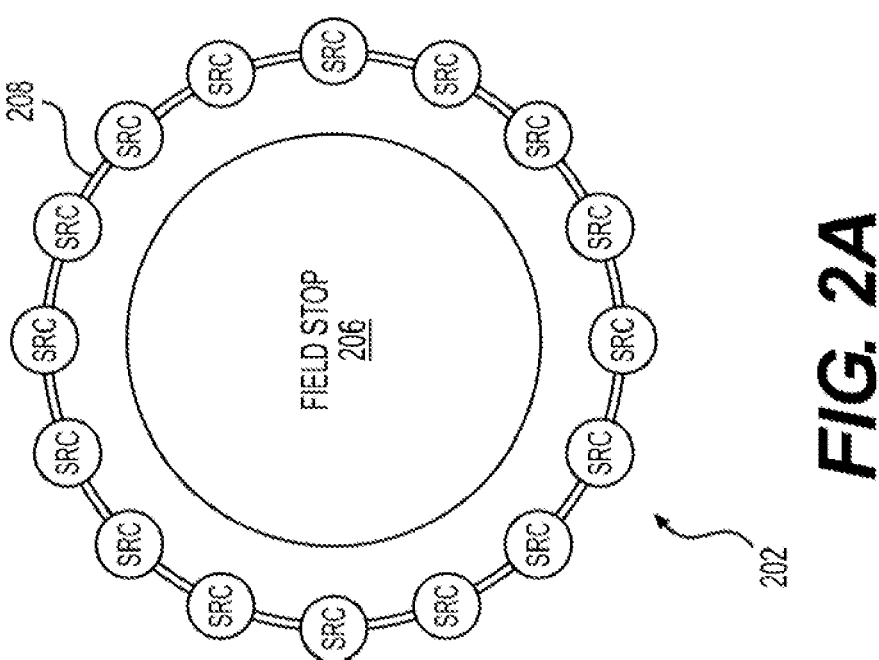

FIGS. 2A-2B are schematic diagrams of example rings 202 and 204 of the light emitting diodes (LEDs) and the optical photodetectors of FIG. 1. FIG. 2A is an example ring 202 of light emitting diodes. Ring 114 of LEDs of FIG. 1 is similar to ring 202. Ring 202 is centered around a field stop 206. The LEDs (SRC) of ring 202 are NIR time-modulated LEDS arranged around a ring structure 208. Other types of LEDs may be used in place of the NIR time-modulated LEDs. Each LED (SRC) produces illuminations in the NIR range. In some implementations, the LEDs (SRC) may illuminate regions in the electromagnetic spectrum different from NIR. In some instances, other shaped structures may be used instead of ring structure 208.

FIG. 2B is an example ring 204 of optical photodetectors. Ring 124 of optical photodetectors of FIG. 1 is similar to ring 204. The optical detectors (DET) of ring 204 are NIR time-modulated photodiodes arranged around a ring structure 210. Other types of photodiodes may be used in place of the NIR time-modulated photodiodes. Ring 204 is centered around an aperture stop 212. Each optical detector (DET) detects reflected signals/illuminations in the NIR range. In some implementations, the optical detectors (DET) may detect reflected signals/illuminations in the electromagnetic spectrum different from NIR. In some instances, other shaped structures may be used instead of ring structure 210.

Figure 3:
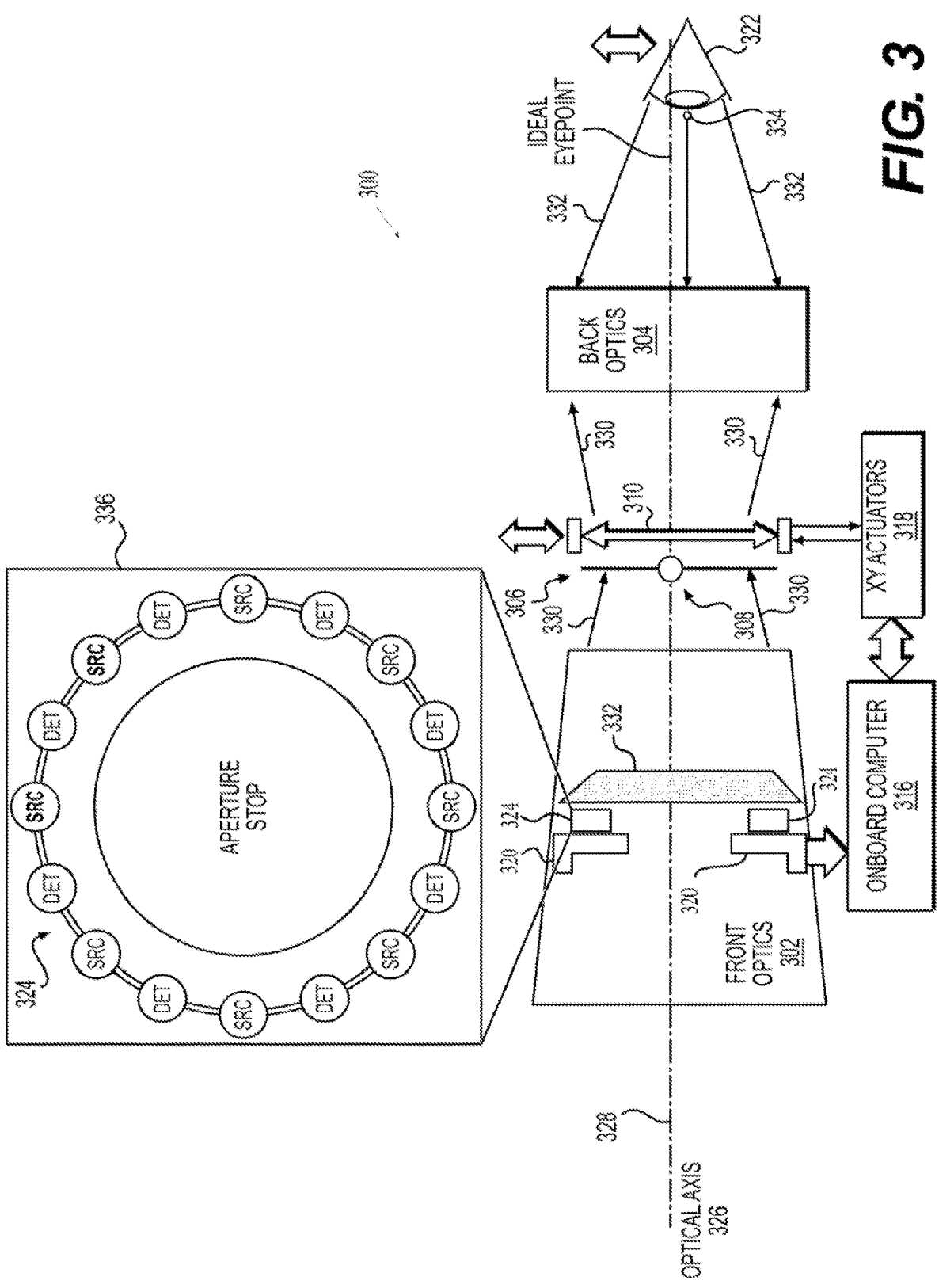
FIG. 3 is a schematic block diagram of an example rifle scope with emitters and detector only located at aperture stop.

FIG. 3 is a schematic block diagram of an example rifle scope 300 with parallax compensation illumination and detectors at aperture stop. The components allowing for parallax compensation may be part of an integrated component and internally placed in rifle scope 300. Rifle scope 300 includes front optics 302, back optics 304, a focal plane 306, a reticule 308, a controllable field lens 310, onboard computer 316, and actuators 318. Front optics 302 includes lenses and/or prisms between the objective and focal plane 306. Additionally, front optics 302 has aperture stop 320. Aperture stop 320 determine how much light reaches the eye 322 to form an image. Aperture stop 320 includes a ring 324 of NIR sources positioned thereon. As shown in inset 336, each ring 324 has NIR time-modulated LEDs (SRC) interleaved with NIR time-modulated photodetectors (DET) along the same ring. Ring 324 must include more than 3 NIR time-modulated LEDs (SRC) and more than 4 NIR time-modulated photodetectors (DET) arranged in each ring.

Focal plane 306 is located amidst front optics 302 and back optics 304 of the rifle scope 300. A reticle 308 is present on the focal plane 306 along with an imaginary line, optical axis 326, that determines the light path through the scope 300. Adjacent to focal plane 306 is a controllable field lens 310, which has a controllable decenter brought about by actuators 318 operated by the onboard computer 316. Onboard computer 316 includes one or more processors capable of controlling and performing the required operations and memories for storing applications and relevant data. Moreover, onboard computer 316 provides for applications to communicate and control the operations of actuators 318. In some implementations, onboard computer 316 may be an embedded processor placed within rifle scope 300. In other implementations, onboard computer 316 may be external to rifle scope 300. In this instance, rifle scope 300 may include wireless capabilities to receive and send data to onboard computer 316.

Actuators 318 provides controllable transverse misalignment to the controllable field lens 310, which helps bring back the eyepoint 328 to coincide with the optical axis 326 of the rifle scope 300 in the target space. Controllable field lens 310 is aligned parallel to focal plane 306, and it rectifies the parallax errors caused due to the horizontal and vertical misalignment of the current eyepoint 334 of eye 322 with respect to the optical axis 326. Actuators 318 which may include microelectromechanical systems (MEMS) actuators, convert electrical signals into mechanical movements of controllable field lens 310. Actuators 318 can shift controllable field lens 310 horizontally, vertically, or rotate it to introduce controllable transverse misalignment. Alternatively, actuators 318 can be electrostatic, electrothermal, electromagnetic, or piezoelectric.

Optionally, circular or non-circular field stops can be placed between the controllable field lens 310 and back optics 304. These field stops can take the form of a diaphragm, a constriction on an optical aperture, or similar mechanisms.

Ring 324 is configured to illuminate eye 322 via illuminations 330 using NIR time-modulated LEDs (SRC). The NIR time-modulated photodetectors (DET) of ring 324 are configured to receive the NIR light scattered back from the eye via reflected signals 332 and sent to onboard computer 316 data regarding the illumination received from reflected signals 332. Onboard computer 316 sends commands to actuators 318 to adjust controllable field lens 310 until the NIR time-modulated photodetectors (DET) of ring 324 receive equal illumination. The adjustment amount is deduced from the initial asymmetry of reflected signals 332 received by the NIR time-modulated photodetectors (DET) of ring 324.

In this case, onboard computer 316 determines the location of the center of gravity (COG) of reflected signals 332 distributed over the NIR photodetectors (DET) of ring 324. If the COG lies on optical axis 326, no further action is required (NIR time-modulated photodetectors (DET) of ring 324 received equal illumination). Otherwise, onboard computer 316 determines the COG coordinates used to determine the proper decenter of controllable field lens 310. The relationship between the COG coordinates and the decenter coordinates can be established experimentally by calibrating rifle scope 300. Since controllable field lens 310 is, by its definition, located very close to focal plane 306, the decenter of controllable field lens 310 has neither impact on target imagery nor reticle imagery.

Although used with a rifle scope in this instance, the approach described herein to compensate for parallax error can also be used with other firearms with an imaging component. Additionally, the approach described herein to compensate for parallax error can be applied to other optical systems and devices, such as telescopes.

Figure 4:
FIG. 4 is a process flowgraph of operations included in an example process for parallax compensation.

FIG. 4 is a process flowgraph of operations included in an example process 400 for parallax compensation. Process 400 includes sending, using a plurality of light emitting devices (such as ring 114 of FIG. 1, ring 202 of FIG. 2, or NIR time-modulated LEDs (SRC) of ring 324) illuminations directed to an eye (such as eye 122 of FIG. 1 or eye 322 of FIG. 3) positioned at a distal end of an optical device (such as rifle scope 100 of FIG. 1 or rifle scope 300 of FIG. 3) (Step 402). Process 400 includes detecting, using a plurality of optical detectors (such as ring 124 of FIG. 1, ring 204 of FIG. 2, or NIR time-modulated photodetectors (DET) of ring 324 of FIG. 3), reflected light received from the eye, each of the optical detectors producing data regarding the reflected light each optical detector observed (Step 404). Moreover, process 400 includes receiving, using a processor device (such as onboard computer 116 of FIG. 1 or onboard computer 316 of FIG. 3), the data on the reflected light (such as reflected light 132 of FIG. 1 or reflected light 332 of FIG. 3) from the optical detectors (Step 406). Furthermore, process 400 includes adjusting, using the processor device, a position of a field lens (such as controllable field lens 110 of FIG. 1 or controllable field lens 310 of FIG. 3) so an eyepoint (such as eyepoint 128 of FIG. 1 or eyepoint 328 of FIG. 3) projected in a target space of the optical device coincides with an optical axis of the optical device removing parallax errors due to misalignment of the eye (Step 408).

In some implementations, the light emitting devices may be light emitting diodes (LEDs). The optical detectors may be photodiodes. The light emitting devices may be positioned in at least one ring. The optical detectors may be positioned in at least one ring different from the ring of the light emitting devices. A select number of the optical detectors and the light emitting devices may be positioned in the at least one ring. The at least one ring of light emitted devices is positioned on a field stop. The at least one ring of optical detectors may be positioned on an aperture stop. The at least one ring of the select number of the optical detectors and the light emitting devices may be positioned on an aperture stop. The processor device is an embedded processor. The processor device may send commands to at least one actuator for adjusting the position of the field lens.

In other implementations, the processor device may determine, based on the data, a center of gravity (COG) of the reflected signals distributed over the least one ring. The processor may determine whether the COG is positioned on an optical axis of the optical system. Upon determining the COG is not positioned on the optical axis, the process may adjust a position of a field lens so an eyepoint projected in a target space of the optical system coincides with the optical axis removing parallax errors due to misalignment of the eye.

The disclosure outlines a system and method for compensating for parallax errors in direct-view scopes. This architecture eliminates all sources of parallax error in real time, regardless of whether the operator's eye is misaligned. Unlike other approaches that require bringing the reticle and target to a common focus, this approach moves the exit pupil of the scope correcting the parallax error, thus negating the impact of eye location. Additionally, a ring architecture for NIR illumination and detection replaces bulky and heavy beam splitters and combiners by avoiding the injection and detection of NIR light along the optical axis. Finally, a controllable field lens is utilized to adjust its position as a compensator for parallax.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances." "in one case," "in some cases." "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A rifle scope comprising:
   a plurality of light emitting devices for sending illuminations directed to a distal end of the rifle scope;

a plurality of optical detectors for detecting reflected light received from the disyal distal end of the rifle scope, each of the optical detectors producing data regarding the reflected light each optical detector observed; and
   a processor device for receiving the data on the reflected light from the optical detectors and adjusting a position of a field lens so an eyepoint projected in a target space of the rifle scope coincides with an optical axis of the rifle scope removing parallax errors due to misalignment.

2. The rifle scope of claim 1, wherein the light emitting devices are light emitting diodes (LEDs).

3. The rifle scope of claim 1, wherein the optical detectors are photodiodes.

4. The rifle scope of claim 1, wherein the light emitting devices are positioned in a first ring.

5. The rifle scope of claim 4, wherein the optical detectors are positioned in a second ring different from the first ring of the light emitting devices.

6. The rifle scope of claim 1, wherein a select number of the optical detectors and the light emitting devices are positioned in a first ring.

7. The rifle scope of claim 5, wherein the first ring of the light emitted devices is positioned on a field stop.

8. The rifle scope of claim 7, wherein the second ring of the optical detectors is positioned on an aperture stop.

9. The rifle scope of claim 6, wherein the first ring having the select number of the optical detectors and the light emitting devices is positioned on an aperture stop.

10. The rifle scope of claim 1, wherein the processor device sends commands to at least one actuator for adjusting the position of the field lens.

11. A method for parallax compensation, the method comprising:
   sending, using a plurality of light emitting devices, illuminations directed to a distal end of an optical device;
   detecting, using a plurality of optical detectors, reflected light received from the distal end of the optical device, each of the optical detectors producing data regarding the reflected light each optical detector observed;
   receiving, using a processor device, the data on the reflected light from the optical detectors; and
   adjusting, using the processor device, a position of a field lens so an eyepoint projected in a target space of the optical device coincides with an optical axis of the optical device removing parallax errors due to misalignment.

12. The method of claim 11 comprising positioning the light emitting devices in a first ring.

13. The method of claim 12 comprising positioning the optical detectors in a second ring different from the first ring of the light emitting devices.

14. The method of claim 12 comprising positioning a select number of the optical detectors and light emitting devices in a first ring.

15. The method of claim 13 comprising positioning the first ring of the light emitted devices on a field stop.

16. The method of claim 15 comprising positioning the second ring of optical detectors on an aperture stop.

17. The method of claim 14 comprising positioning a first ring having the select number of the optical detectors and light emitting devices on an aperture stop.

18. The method of claim 11 comprising sending, using the processor device, commands to at least one actuator for adjusting the position of the field lens.

19. A parallax compensation system comprising:

a plurality of light emitting devices for sending illuminations directed to a distal end of an optical device;

a plurality of optical detectors for detecting reflected light received from the distal end of the optical system, each of the optical detectors producing data regarding the reflected light each optical detector observed; and a processor device for receiving the data on the reflected light from the optical detectors and adjusting a position of a field lens so an eyepoint projected in a target space of the optical device coincides with an optical axis of the optical device removing parallax errors due to misalignment.

20. The parallax compensation system of claim 19, wherein the processor is configured to:

determine, based on the data, a center of gravity (COG) of the reflected signals distributed over the least one ring;

determine whether the COG is positioned on an optical axis of the optical system; and upon determining the COG is not positioned on the optical axis, adjust a position of a field lens so an eyepoint projected in a target space of the optical system coincides with the optical axis removing parallax errors due to misalignment.

\* \* \* \* \*